United States Patent
Anto Emmanuel

(10) Patent No.: US 8,059,631 B2
(45) Date of Patent: Nov. 15, 2011

(54) LOCATION SYSTEM AND METHOD FOR ASSISTING EMERGENCY SERVICES IN IDENTIFYING THE PHYSICAL LOCATION OF AN IP TELEPHONY USER

(75) Inventor: Oliver Rex Anto Emmanuel, Oakville (CA)

(73) Assignee: Phybridge, Inc., Mississauga (CA)

( * ) Notice: Subject to any disclaimer, the term of this patent is extended or adjusted under 35 U.S.C. 154(b) by 1158 days.

(21) Appl. No.: 11/826,304

(22) Filed: Jul. 13, 2007

(65) Prior Publication Data

US 2009/0016517 A1    Jan. 15, 2009

(51) Int. Cl.
*H04L 12/66* (2006.01)
(52) U.S. Cl. ...... 370/352; 370/392; 370/338; 455/404.2
(58) Field of Classification Search .................. None
See application file for complete search history.

(56) References Cited

U.S. PATENT DOCUMENTS

| | | | |
|---|---|---|---|
| 7,177,399 B2 * | 2/2007 | Dawson et al. | 379/45 |
| 2005/0003797 A1 * | 1/2005 | Baldwin | 455/404.1 |
| 2005/0083911 A1 | 4/2005 | Grabelsky et al. | |
| 2006/0004905 A1 | 1/2006 | Martino | |
| 2006/0274725 A1 | 12/2006 | Freitag et al. | |
| 2007/0058615 A1 | 3/2007 | Hasenfang et al. | |
| 2007/0147348 A1 * | 6/2007 | Lu | 370/352 |
| 2007/0274299 A1 * | 11/2007 | Ruckart | 370/356 |
| 2008/0013696 A1 * | 1/2008 | Motley et al. | 379/45 |
| 2010/0149030 A1 * | 6/2010 | Verma et al. | 342/357.09 |

OTHER PUBLICATIONS

International Search Report for International Patent Application No. PCT/CA2008/001244, filed Jul. 4, 2008, Form PCT/ISA/210, ISA/CA: CIPO, Gatineau, Quebec.

* cited by examiner

*Primary Examiner* — Duc C Ho
(74) *Attorney, Agent, or Firm* — Grant Tisdall; Gowling Lafleur Henderson LLP

(57) ABSTRACT

A location device for associating a physical location with a communications device. The communications device has assigned device identification and uses an assigned network address for use in routing call data over a communications network. The location device comprises a memory for storing location information related to the physical location and a device port for coupling to the communications device and a network port for coupling to the communications network. The ports are configured for communicating the call data between the ports. The device also has a monitoring module configured for monitoring operation of at least one of the ports in order to detect an initialization process of the communications device, as well as to identify the assigned device identification. The device also has a location registration module configured for communicating a location update message over the communications network via the network port in response to the detected initialization process, such that the location update message including the location information and the identified device identification.

22 Claims, 8 Drawing Sheets

LOCATION SYSTEM AND METHOD FOR ASSISTING EMERGENCY SERVICES IN IDENTIFYING THE PHYSICAL LOCATION OF AN IP TELEPHONY USER

BACKGROUND

The introduction of Automatic Number Identification (ANI) added a new dimension to emergency call services such as 911. The caller's phone number could now be delivered along with a call and be displayed on a Public Safety Answering Point (PSAP). The method of using ANI can identify the caller even if the caller is not able to do so themselves. ANI is used to help ensure the feasibility of all callbacks in all emergency situations. The PSAP also uses the caller's telephone number to identify the caller's name and address information, as telephone companies store subscriber data based upon telephone number. Also, equipment and corresponding data circuit(s) at the PSAP can take the telephone number, wrap it in a data message, and use it to query an Automatic Location Identification (ALI) database, which has been specifically constructed for this purpose. This configuration facilitates the automatic delivery of the name, address and telephone number, however only for 911 callers having land based phone lines that are installed in a permanent, known, physical location. The telephone numbers of traditional telephones have a constant location associated therewith, since both the telephone number and the telephone location is associated with the installed service jack, due to the topology. This is not the case with more transient telephone devices, such as IP phones and mobile telephones.

Telecommunication rules require mobile phones to provide their latitude and longitude to emergency operators in the event of a 911 call. Carriers can choose whether to implement this via GPS chips in each phone, or via triangulation between cell towers. In addition, the rules can require carriers to connect 911 calls from any mobile phone, regardless of whether that phone is currently active. A mobile caller's geographical information may not always be available to the local PSAP, due to limitations in technology (e.g. of the mobile phone, cell phone towers, and/or PSAP equipment).

Further, if 911 is dialled from a commercial IP telephony service, depending on how the provider handles such calls, the call may not go anywhere at all, or it may go to a non-emergency number at the public safety answering point associated with the billing or service address of the caller. Because a VoIP telephone call can be made using any broadband Internet connection, the IP caller could be many miles away from their home. If the IP call goes to an answering point at all, it could be associated with the caller's address and not the actual location of the IP phone. Further, the use of GPS technologies (as for cell phones) may not always be feasible for IP phones, since they can be installed indoors where a consistent GPS signal may not be obtainable.

Selective routing is important to provide response efficiency for the emergency services responding to the caller. Selective routing routes the 911 call to the proper PSAP, based upon the known location of the caller. Selective Routing can be controlled by the Emergency Service Number (ESN)—a three to five digit number representing a unique combination of emergency service agencies designated to serve a specific range of caller addresses within a particular geographical area or Emergency Service Zone (ESZ). Emergency calls can use a ten-digit ANI number, out pulsed by a PBX/call server, that is combined with the ALI or Emergency Response Location (ERL). For example, the ALI or ERL is a 20-character field that defines the location of a 911 caller including the floor/room/descriptive area within any building. Each phone that can dial 911 should have a location associated with it at the regional ALI database. Current emergency call systems (e.g. enhanced 911 systems) are configured to use selective routing, ANI, ALI, selective transfer and fixed transfer (i.e. speed dialing).

However, updating and maintaining this critical ALI information at the regional database requires strict guidelines and potentially many human resources in a complex environment that is subjected to constant changes. Further, as the IP phone changes locations, the new location of the user must be registered on the communications network in real time. Tracking the location of IP phones can be a significant challenge, as in IP telephony the identity is carried in the phone (i.e. the MAC address is associated with the phone user). Therefore, a problem arises when the IP telephone user changes location, which makes determination of the location of the user placing the 911 difficult to establish. This is due to the fact that all calls are associated with the MAC address of the calling IP telephone, where no tangible information is currently available disclosing the physical location where the call originated.

SUMMARY

The IP telephony environment is lacking a dependable system for locating the physical location of a user placing a call via an IP telephone. What is needed is location system to alleviate or otherwise mitigate at least some of the above-mentioned problems.

The telephone numbers of traditional telephones have a constant location associated therewith, since both the telephone number and the telephone location is associated with the installed service jack, due to the topology. This is not the case with more transient telephone devices, such as IP phones and mobile telephones. As the IP phone changes locations, the new location of the user must be registered on the communications network in real time. However, tracking the location of IP phones can be a significant challenge, as in IP telephony the identity is carried in the phone (i.e. the MAC address is associated with the phone user). Therefore, a problem arises when the IP telephone user changes location, which makes determination of the location of the user placing the 911 difficult to establish. Contrary to present location systems and methods, there is provided a location device (and associated method) for associating a physical location with a communications device. The communications device has assigned device identification and uses an assigned network address for use in routing call data over a communications network. The location device comprises a memory for storing location information related to the physical location and a device port for coupling to the communications device and a network port for coupling to the communications network. The ports are configured for communicating the call data between the ports. The device also has a monitoring module configured for monitoring operation of at least one of the ports in order to detect an initialization process of the communications device, as well as to identify the assigned device identification. The device also has a location registration module configured for communicating a location update message over the communications network via the network port in response to the detected initialization process, such that the location update message including the location information and the identified device identification.

According to one aspect of the invention there is provided a location device for associating a physical location with a communications device, the communications device configured for having an assigned device identification and configured for using an assigned network address for use in routing call data over a communications network, the location device comprising: a memory for storing location information related to the physical location; a device port for coupling to the communications device and a network port for coupling to the communications network, the ports configured for communicating the call data between the ports; a monitoring module configured for monitoring operation of at least one of the ports for detecting an initialization process of the communications device and for identifying the assigned device identification; and a location registration module configured for communicating a location update message over the communications network via the network port in response to the detected initialization process, the location update message including the location information and the identified device identification.

A further aspect provided is a method for associating a physical location with a communications device, the communications device configured for having an assigned device identification and configured for using an assigned network address for use in routing call data over a communications network, the method comprising the acts of: storing location information related to the physical location; coupling to the communications device and a network port for coupling to the communications network; monitoring operation of at least one of a network port coupled to the communications network and a device port coupled to the communications device for detecting an initialization process of the communications device and for identifying the assigned device identification, the ports configured for communicating the call data between the ports; and communicating a location update message over the communications network via the network port in response to the detected initialization process, the location update message including the location information and the identified device identification.

BRIEF DESCRIPTION OF THE DRAWINGS

These and other features will become more apparent in the following detailed description in which reference is made to the appended drawings by way of example only, wherein:

FIG. 1b is a block diagram of a emergency call distribution system of FIG. 1a;

FIG. 2 is a block diagram of an example configuration of the devices of FIG. 1a;

FIG. 3 is one embodiment of the location device of FIG. 1a;

DESCRIPTION

VoIP Communications Environment 10

Figure 1A:
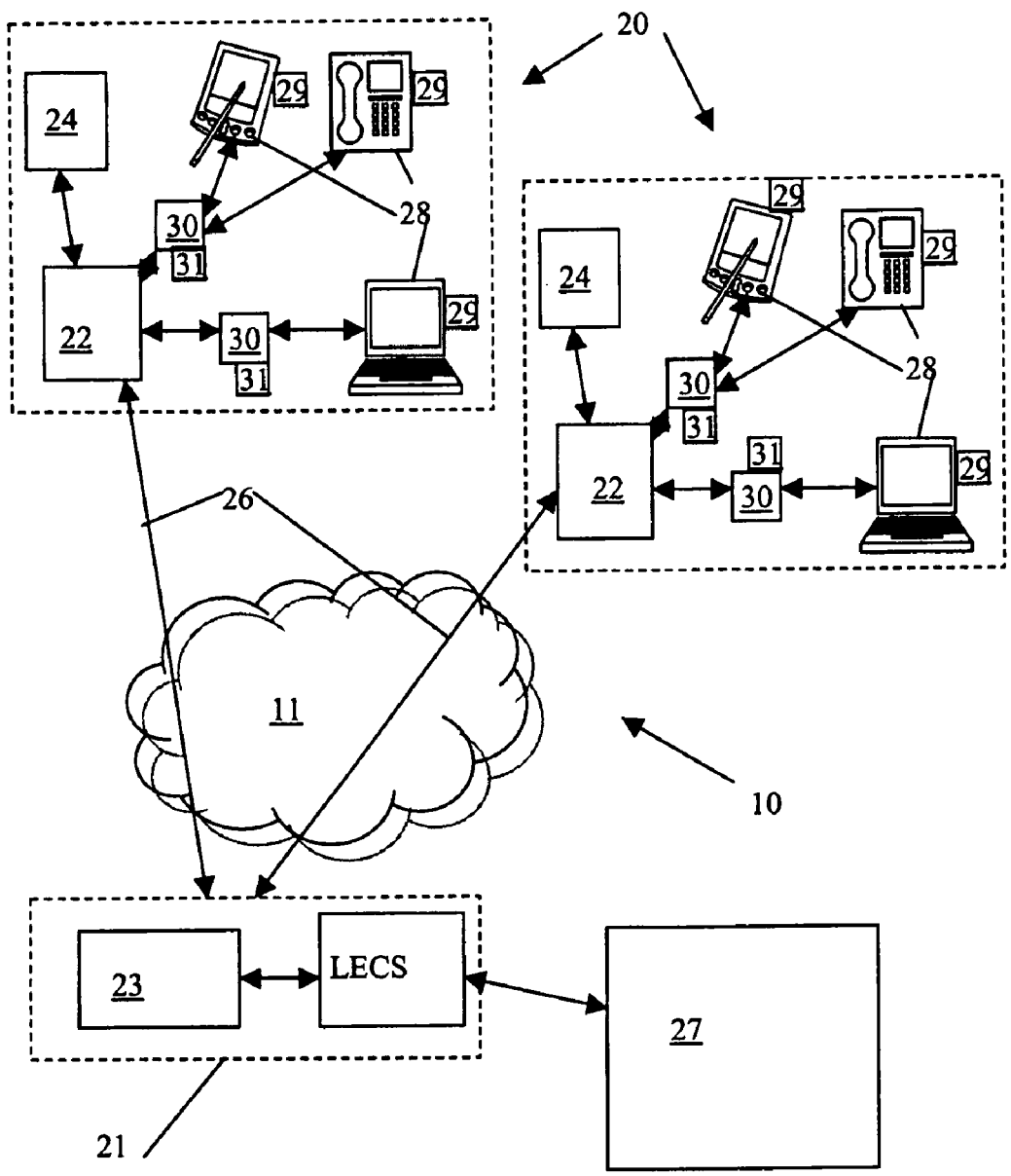
FIG. 1a is a block diagram of a communications environment.

Referring to FIG. 1a, shown is a communications environment 10 that facilitates communication of data 26 (e.g. voice and/or voice with associated video data) over a network 11 (e.g. the Internet) using IP telephony with respect to a plurality of communication devices 28 (e.g. IP phones, computers, wired PDAs, etc.). Voice over Internet Protocol (also called VoIP), IP Telephony, Internet telephony, Broadband telephony, Broadband Phone and/or Voice over Broadband, for example, is the routing of voice conversations over the Internet or through any other IP-based network 11. Companies providing VoIP service can be referred to as VoIP providers, and protocols which are used to carry voice signals over the IP network 11 can be referred to as Voice over IP or VoIP protocols.

The communication devices 28 can be distributed in a plurality of communication environments 20 that are connected to the network 11 via a network server 22. The network server 22 is used as a communications interface between the communication environments 20 and the network 1. For example, the network server 22 provides for data 26 communications between the communication devices 28 and a communication proxy system 21 (e.g. Local Exchange Carrier—LEC—and/or an SIP proxy server 23).

The SIP (Session Initiation Protocol) is used to supply one address to the user, which can be used for text, video, and/or voice communications. SIP addresses have the same format as email addresses and can be used via the SIP server 23 as an email address and mobile phone, work phone, and home phone numbers. The data 26, including emergency call information (e.g. 911), is forwarded by the LEC to an emergency call distribution system 27, as further described below. The data 26 includes a device identity 29 that is associated with physical location information 31, as further described below.

It is recognised that the geographic/physical coordinates of the communication devices 28 that are wired (rather than wirelessly connected) to the network 11 can change, depending upon the user's location. The geographic location of a particular communication device 28 can change from one communication environment 20 to the next, e.g. from a user's home to the user's office building, as well as can change to different locations within a particular communication environment 20, e.g. from one office room/floor to the next. Each of the communication devices 28 is assigned a device identity 29 that is carried with the communication device 28 (e.g. a MAC address), which is subsequently associated with the user of the communication device 28. All calls (e.g. voice/video data 26) made from the communication device 28 are associated with the assigned device identity 29 of the communication device 28. Location information 31 disclosing the physical location where the communication device 28 is connected to the network 11 (via a network server 22) is associated with a location device 30, as further described below. It is recognised that the physical location of the location device 30 can be defined on a per building (e.g. residential address) and/or on a per room/floor (e.g. particular office in an office building) in a building, for example. It is recognised that the location information 31 can be provided in a flexible format, such that the location information 31 can be as precise as desired by an emergency call distribution system 27.

Referring again to FIG. 1a, an administration server 24 (or other mechanism) facilitates the assignment/registration of a network address (e.g. IP address, SIP address) to a particular communications device 28 located in the corresponding communications environment 20, as recognised by the network server 22. One example of this is where an IT person sets up an IP phone in a office of a company user, such that the administration server 24 assigns a selected IP address to the particular communications device 28 connected to the network 11. Once registered, the particular communications device 28 is enabled to communicate via IP telephony over the network 11 with the communication proxy system 21. It is recognised that the above IP addresses also include transient IP addresses (leased) for routing using IP addresses. The location device 30 is compatible with fixed and/or transient IP addresses (as an example of the network 11 addresses). Further, in case of wireless, the base station of the wireless transmissions can be identified.

Example Device 28, 30 Configuration

The following is an example configuration of the communications device 28 as well as the location device 30.

Figure 2:
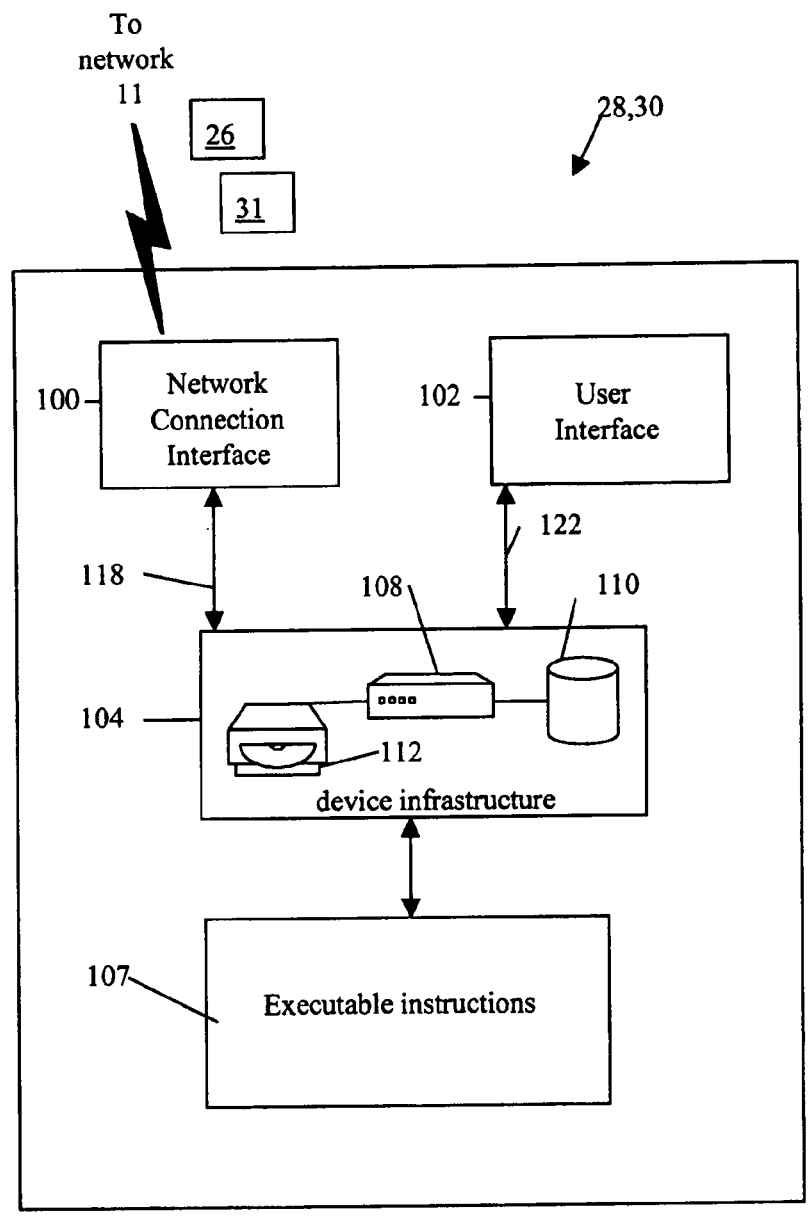

Referring to FIG. 2, the devices 28, 30 can include a network interface 100 (e.g. transceiver/modem) coupled via connection 118 to an infrastructure 104. The network interface 100 (e.g. the ports 200, 202 in the case of the device 30) is connectable during operation of the devices 28, 30 to the network 11 by a suitable channel, e.g. wireless RF or IR links or Ethernet connection, which enables the devices 28, 30 to communicate with each other and with external systems (such as the network server 22 and the emergency database 114 in the case of the location device 30) via the network 11. The network 11 supports the transmission of data 26 (e.g. voice, voice and associated video, ANI, location information 31, etc.) and associated initialization messages (e.g. DHCP, BOOTP, SIP messages).

Referring again to FIG. 2 the devices 28, 30 can also have a user interface 102, coupled to the infrastructure 104 by connection 122, to interact with a user (not shown). The user interface 102 can include one or more user input devices such as but not limited to a USB port, a QWERTY keyboard, a keypad, a track wheel, a stylus, and a user output device such as an LCD screen display. If the screen is touch sensitive, then the display can also be used as the user input device as controlled by the infrastructure 104. The user interface 102 can be employed by the user of the device 28, 30 to facilitate a voice communication over the network 11 (in the case of the device 28) or to facilitate programming of the location information 31 (in the case of the device 30). Further, it is recognised that the data 26 can pass through the location device 30 (e.g. forwarded) or the location device 30 can store the data 26 and then forward the data 26, thus facilitating the location device 30 to analyze the data 26 (and amend if needed —e.g. embed the location information 31), once received from the communications device 28, before forwarding the data 26 for transmission over the network 11.

Referring again to FIG. 1b, operation of the devices 28, 30 can be enabled by the infrastructure 104. The device infrastructure 104 can include a computer processor 108 and associated memory module 110. The computer processor 108 manipulates the operation of the device 28, 30 configured for the intended task through operation of the network interface 200, the user interface 202 and other application programs/hardware 107 of the device 28, 30 by executing task related instructions. These task related instructions can be provided by an operating system, and/or software applications 107 located in the memory 110, and/or by operability that is configured into the electronic/digital circuitry of the processor(s) 108 designed to perform the specific task(s). Further, it is recognized that the infrastructure 104 can include a computer readable storage medium 112 coupled to the processor 108 for providing instructions to the processor 108 and/or to load/update the device 28, 30 with configuration data in the memory module 110 (e.g. in the case of the locations device 30, the configuration data can be the content of the location information 31). The computer readable medium 112 can include hardware and/or software such as, by way of example only, magnetic disks, magnetic tape, optically readable medium such as CD/DVD ROMS, and memory cards. In each case, the computer readable medium 112 may take the form of a flash memory, small disk, floppy diskette, cassette, hard disk drive, solid-state memory card, or RAM provided in the memory module 110. It should be noted that the above listed example computer readable mediums 112 can be used either alone or in combination.

Further, it is recognized that the devices 28, 30 can include the executable applications 107 comprising code or machine-readable instructions (logic can also be implemented in hardware—e.g. ASIC, FPGA, PLD etc.) for implementing predetermined functions/operations. The processor 108 as used herein is a configured device and/or set of machine-readable instructions for performing operations as described by example above. As used herein, the processor 108 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the location device 30 (e.g. modules 200, 202, 206, 208, 210, 212, and subset thereof) may be implemented in hardware or a combination of hardware and software. Accordingly, the use of a processor 208 as a device and/or as a set of machine-readable instructions (e.g. logic implemented in hardware) is hereafter referred to generically as a processor/module for sake of simplicity.

Emergency Call Distribution System 27

Figure 1B:
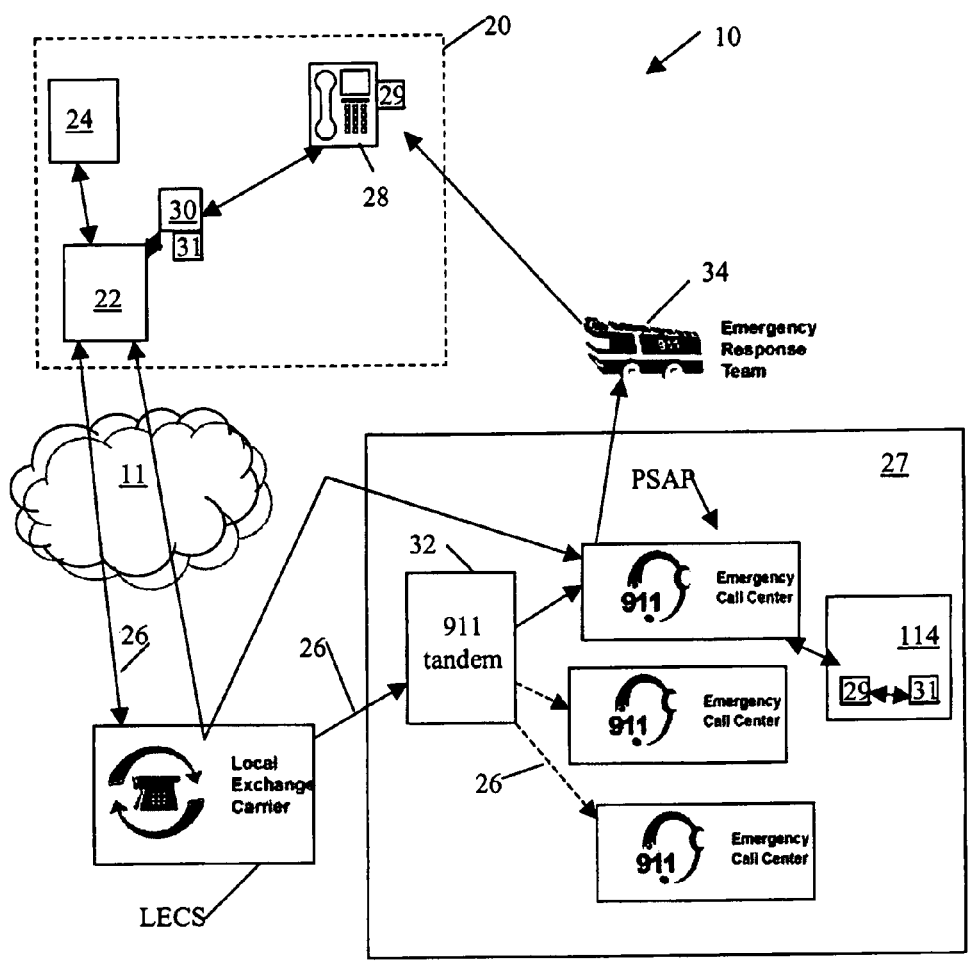

Referring to FIG. 1b, shown are further details of the emergency call distribution system of FIG. 1a.

For example, first location information 31 of the location device 30 is stored in the emergency database 114 along with the device ID 29 (e.g. MAC address) of the communications device 28, for subsequent use in associating the user of the communications device 28 with the physical location of the location device 30. It is recognised that the location information 31 can become associated with the device ID of the communications device 28 during the initialization of the device 28 with the network 11, as further described below.

Next, the user uses the communication device 28 to make an emergency call over the IP network 11. A local exchange carrier LECS receives the call data 26, such as but not limited to the voice signal, the device ID 29 (e.g. a 10-digit routing number), the Automatic Number Identification (ANI) signal, and potentially some of the location information 31 of location device 30 associated with the user's communication device 28). The routing number alerts the local exchange carrier LECS that the call is an emergency, and the call data 26 is routed to an emergency tandem (e.g. the carrier's 911 switch) 32. The tandem 32 decides automatically (for example the association of the device identification 29 with the location information 31) the by reading the ANI information and routes the callback number to a digital display at the appropriate emergency call center PSAP (i.e. assigns the call data 26). The final destination of the emergency call (e.g. data 26) is a Public Safety Answering Point (PSAP), an agency (typically regionally controlled) responsible for answering 9-1-1 calls for emergency assistance from police, fire, and ambulance services, for example. There may be multiple PSAPs within the same exchange (accessible by the local carrier switch—LECS) or one PSAP may cover multiple exchanges, as desired. The territories covered by a single PSAP can be done based on historical and legal police considerations rather than telecommunications issues.

Armed with this ANI information, including the device ID 29 and/or the location information 31 (e.g. the location ID), the PSAP requests and receives the caller's physical address from the emergency database 114. As well, the PSAP dispatcher can concentrate on helping the caller through the crisis, for example via voice communication, while instantly passing along needed location information to the correct response team 34 to respond to the needs of the caller.

Communications Device 28

Referring again to FIG. 1*a*, the communications devices 28 (e.g. VoIP phone) are used to receive incoming phone calls and to place outgoing phone calls, which are automatically routed with respect to the communications device 28 using the assigned network 11 address, regardless of where the communications device 28 is physically connected to the network 11. For example, the user can take their communications device 28 with them on a trip, and wherever they connect to the Internet, they can receive incoming calls. Accordingly, operation of VoIP is location independent and only an Internet connection is needed to get a registered connection to a VoIP provider, further described below. The physical location of the communications device 28, when connected to the network 1, is recognised using the location information 31 assigned to the respective location device 30 that the communications device 28 is connected to, as further described below.

Referring to FIG. 1*a*, there are many examples of the communications device 28 suitable for facilitating voice communication (e.g. VoIP) over the network 11. One example of the communications device 28 is an analog telephone connected to an ATA (Analog Telephone Adaptor), which is plugged into the location device 30. The ATA provides for a standard phone to be connected to the network 11 (e.g. Internet) connection (e.g. network server 22) for use with VoIP. For example, voice service providers like Vonage™ and AT&T CallVantage™ bundle ATAs with their service.

A further example of the communications device 28 are IP Phones, which are specialized phones that look like normal phones with a handset, cradle and buttons. The IP phones have an RJ-45 Ethernet connector for connecting directly to the network 11, instead of having the standard RJ-11 phone connectors. IP phones are configured to be coupled with the network server 22 and have all the hardware and software onboard to handle voice communications using IP protocols and/or SIP for the call (e.g. data 26).

A further example of the communications device 28 is a computer configured for VoIP communications, using VoIP software, a microphone, speakers, a sound card and an Internet connection via the network server 23 22 (e.g. via a cable or DSL modem). A further example of the communications device 28 is a PDA that is communicates through one of the location devices 30 assigned to the communications environment 20.

It is recognised that the communications device 28 can be embodied as a hardware endpoint or a software endpoint. Hardware endpoints are communication devices 28 with the look, feel, and shape of a traditional telephone, but can use IP, SIP, H.323 and RTP for communication. Some of these hardware endpoints can use Electronic Numbering (ENUM) or DUNDi to translate existing phone numbers to SIP addresses using DNS, so calls to other SIP users can bypass the telephone network. Software endpoints are also common which use a computer to emulate the voice/video functionality of a phone, such as but not limited to; Microsoft Windows Messenger, iChat AV, Twinkle, Ekiga, Kphone, and other GPL applications.

The communication device 28 has the device identity 29 assigned, which is associated with each of the calls (e.g. data 26) that interact with the communication device 28. One example of this device identity is the MAC address (Media Access Control), which represents the communication device's 28 name (e.g. ID) on a LAN. An Ethernet MAC address can be a six-byte number, usually expressed as a twelve digit hexadecimal number (Example: 1AB4C234ABIF). The MAC address is used by the Media Access Control sublayer of the Data-Link Layer (DLC) of telecommunication protocols. There is a different MAC sublayer for each physical device type. Also known as the hardware address or Ethernet address, the MAC address is a unique identifier specific to the network card inside the communications device 28 that allows the DHCP registration process to authenticate that the communications device 28 is allowed to access the network 11. In general, MAC Addresses are of the form XX-XX-XX-XX-XX-XX, where the X's are digits and/or letters from A to F. The MAC address makes the communications device 28 recognizable to and distinguishable from other communications devices 28, as an identity code built into every Ethernet card, which uniquely identifies that card from all others in the world. The MAC addresses can either be "universally administered addresses" or "locally administered addresses", such that a universally administered address (sometimes called "burned-in address") is uniquely assigned to a communication device 28 by its manufacturer. It is recognised that the device ID can be always unique to facilitate identification of a particular communications device 28.

ARP (Address Resolution Protocol) is used to convert from addresses in a layer 3 protocol such as Internet Protocol (IP) to the layer 2 MAC address. On broadcast networks 11, such as Ethernet, the MAC address allows each communications device 28 to be uniquely identified and allows data 26 communicated over the network 11 to be marked for specific communications devices 28.

Location Device 30

Referring to FIG. 1*a*, each of the location devices 30 is assigned to a respective communications environment 20 and/or to a specific location/region in the communications environment 20. The location device 30 is associated with the location information 31 that defines the physical location of the location device 30, information such as but not limited to: a device identifier (e.g. unique alpha/numerical descriptor); a street/mailing address (e.g. of the communications environment 20); a coordinate (e.g. latitude and longitude—of the communications environment 20) and a description of the location within the communications environment 20 (e.g. room/floor number). The location information 31 is used by personnel of the emergency call distribution system 27 to associate the caller's device identifier 29 (e.g. IP phone number/address) with a physical street address, for example, or other geographic location. The location information 31 provides emergency responders with the location of the emergency without the person calling for help having to provide it. This can be useful in times of fires, break-ins, kidnapping, and other events where communicating one's location to the emergency call distribution system 27 is difficult or largely impossible.

One of the functions of the location device 30 is that it updates the physical location of any communications device 28 that is connected to the location device 30. The location device 30 can already have the ALI and/or ERL information (e.g. location information 31) programmed into it and stored in the memory 110 (see FIG. 2). Alternatively, each location device 30 can have a unique identification number assigned to the location device 30 that can be associated with a physical location in an emergency database 114 of the emergency call distribution system 27 (see FIG. 1*b*).

Ports 200,202

Figure 3:
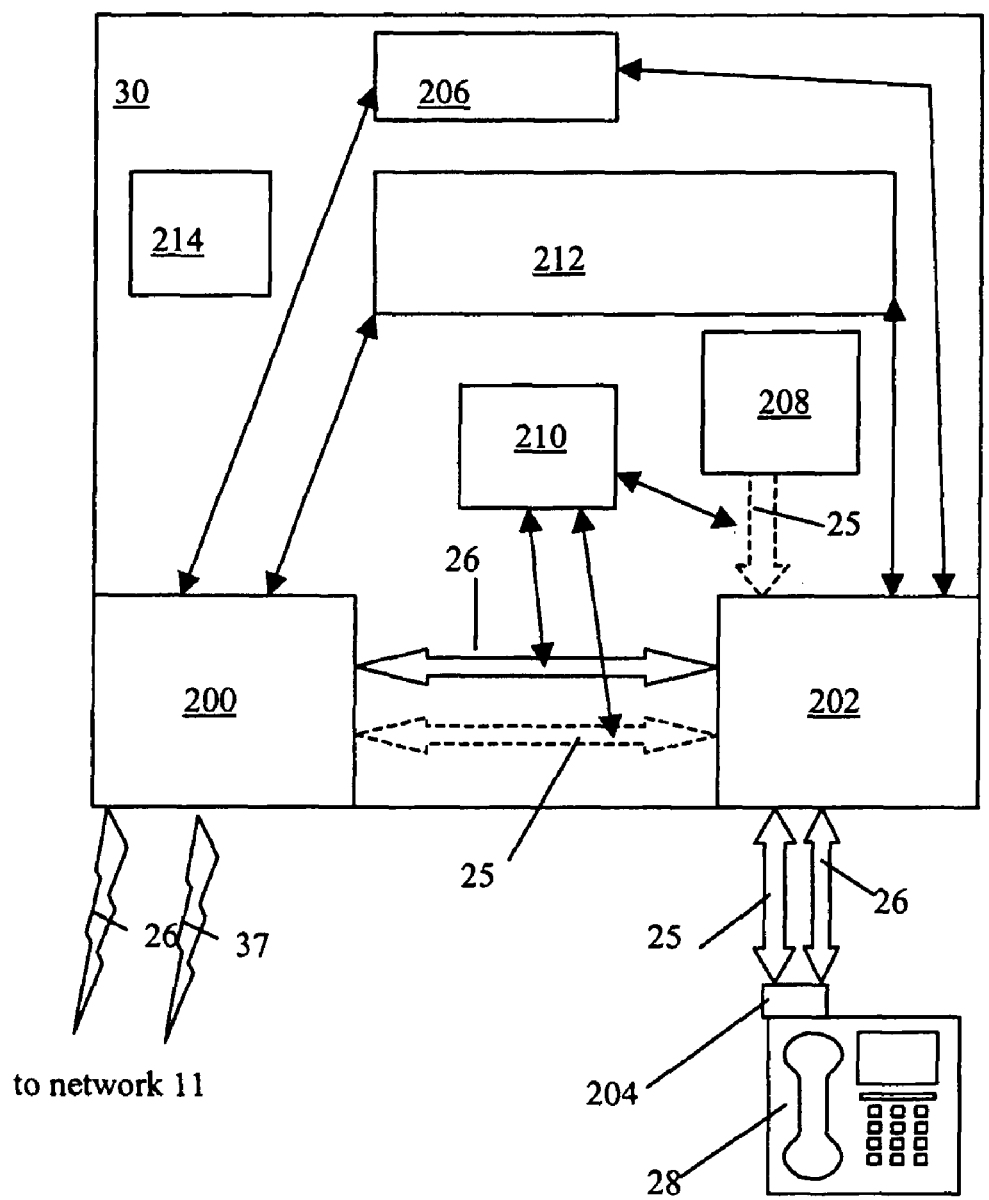
Figure 4:
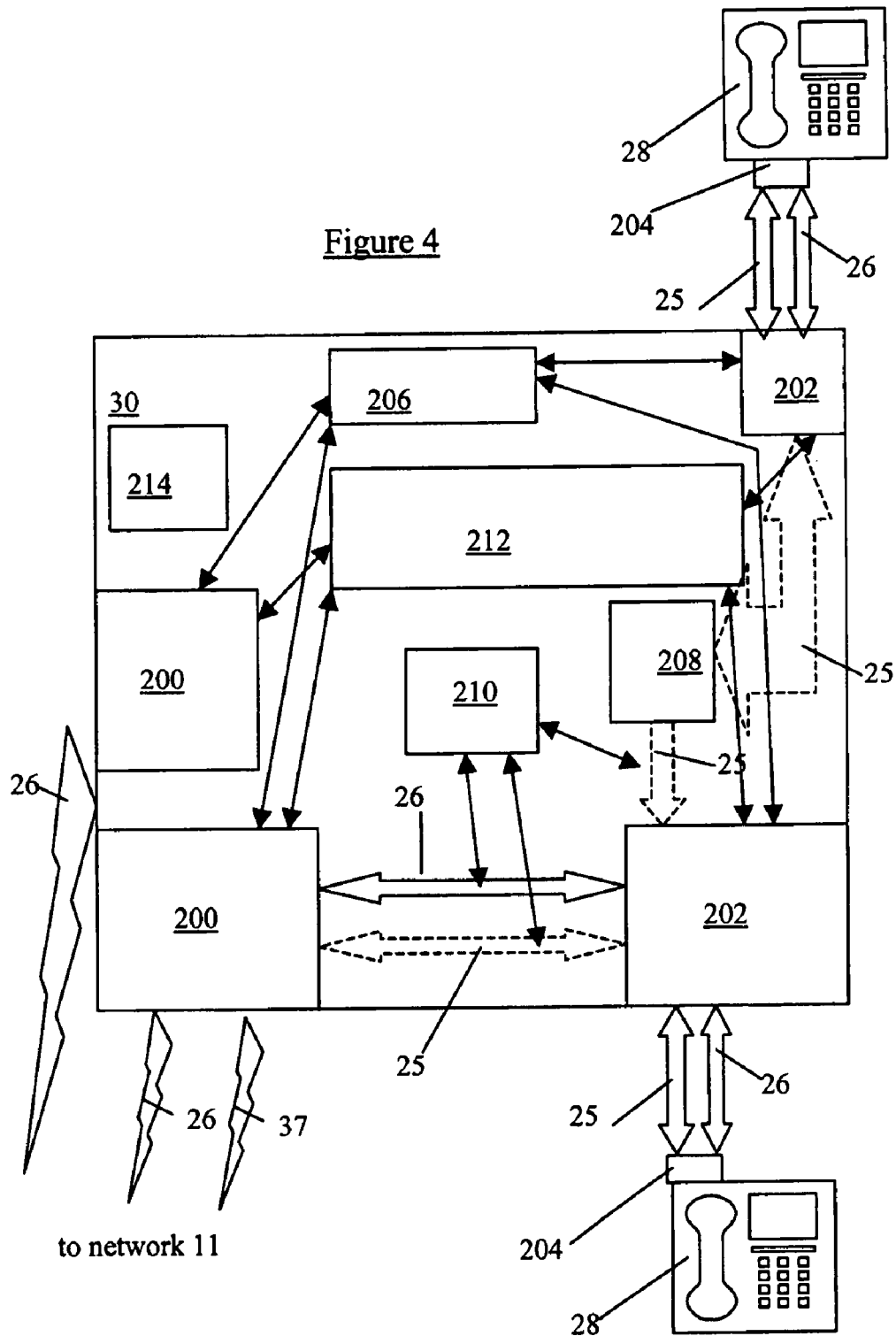
FIG. 4 is a further embodiment of the location device of FIG. 3.

Referring to FIG. 3, shown is the location device/system 30 having a network port 200 for coupling the device 30 to the network 11 (e.g. an intranet) and a device port 202 for connecting to a communications port 204 of the communications device 28. The ports 200,202 are configured so as to facilitate the communication of any data 26 (e.g. data packet(s)) entering any port to be broadcast out on every/selected port other than the port of entry. For example, the location device 30 communicates all data 26 received from the network 11 via the network port 200 to the device port 202 and vice versa. It is recognised that the location device 30 can operate similar to a hub in that the location device 30 forwards all data 26 in both directions between the ports 200, 202, or the location device 30 can have a switching module 206 for directing the data 26 between one or more ports 200 and/or ports 202, as desired. For example, referring to FIG. 4, shown is a further embodiment of the location device 30 having the network port 200 and multiple device ports 202 for connecting to two or more communication devices 28, located in an acceptable proximity (e.g. same room, same building, etc.) to one another with respect to any regulations of use for the location device 30. It is recognised that a monitoring module 210 would also monitor the data 26 and/or power 25 communications between all (not shown) of the ports 200, 202 of the location device 30 of FIG. 4.

One example operation of the location device 30 for data 26 communication is as a passive hub that serves as a conduit for the data 26, enabling that data 26 to go from one device (or segment) to another. The location device 30 can also have features of an intelligent/manageable hub for monitoring the data 26 traffic passing through the location device 30 and to configure each port 200, 202 accordingly. Another example operation of the location device 30 for data 26 communications is as a switching hub, which actually reads the destination address of each data 26 packets and then forwards the data 26 packets to the correct port 200,202. Regarded in the switching aspects, location device 30 can also include a router, as desired.

It is recognised that in the case of wireless communications, the location device 30 can have the device port 202 configured as a short-range wireless communication module, such as but not limited to Bluetooth™ technology, facilitating transmission of signals over short distances between communication devices 28 and the location device 30 without the use of wires. The short-range wireless module can provide functionality similar to a cable or infrared connections for communication of data 26 between the communication devices 28 and the network 11 connection adjacent to the communication device 28. For example, the short-range wireless module can be compatible with bandwidth capabilities of between 500-2000 kbits and a range of approximately 1-5-10 meters. It is recognised that line-of-sight may not be required between the devices for the short-range wireless communications of the data 26. For example, Bluetooth transmits in the frequency range 2.4 to 2.4835 GHz and achieves data rates of up to 721 kilobits per second for ranges of up to 10 meters. The short-range wireless communication module can facilitate radio interfacing between the devices 28,30.

Power Supply 208

Referring again to FIG. 3, the location device 30 is connected to a power source 208 for facilitating operation of the location device 30. For example, the power source 208 can be an independent power source or the power 25 can be supplied to the location device 30 via Power over Ethernet (POE) (also known as Power over LAN (POL) and inline power), used to facilitate the powering of attached devices via Ethernet ports (e.g. the ports 200, 202). In the case of POE, the power 25 would enter the location device 30 via the network port 200, for example. Regarding POE, the IEEE 802.3af standard is one example that provides 48 volts DC over two of the four available pairs on a Cat. 3/Cat. 5 cable with a maximum current of 400 milliamperes for a maximum load power of 15.4 watts. Further, it is recognised that the powered pairs may also carry the data 26, which facilitates the use of 1000 BASE-T (Gigabit Ethernet) for all four pairs for data 26 transmissions. Accordingly, the location device 30 has access to power 25 via the power source 208 for operation of the location device 30, for example, or the location device 30 can also be configured as a conduit for providing power to the communications device 28 (e.g. via POE). For example, the device port 202 provides the delivery of power 25 for operating the communications device 28, as well as for facilitating communication of the data 26 to/from the network 11. For example, the location device 30 can incorporate an independent power supply to act as a POE injector, having the data port 200, the device port 202 (data 26 plus power 25 port) and the separate power supply 208 (e.g. 48V DC power supply) which provides power 25 to the device port 202.

Accordingly, in view of the above, the locations device 30 can receive power 25: from the POE (e.g. as defined by IEEE 802.3af); using an ultra-low power IC in conjunction with a trickle-charge mechanism off of the network 11 cable to charge a battery or capacitor for providing adequate power 25 for the monitoring and registration processes, further described below; and/or using the traditional power source 208, as desired.

Monitoring Module 210

Figure 5A:
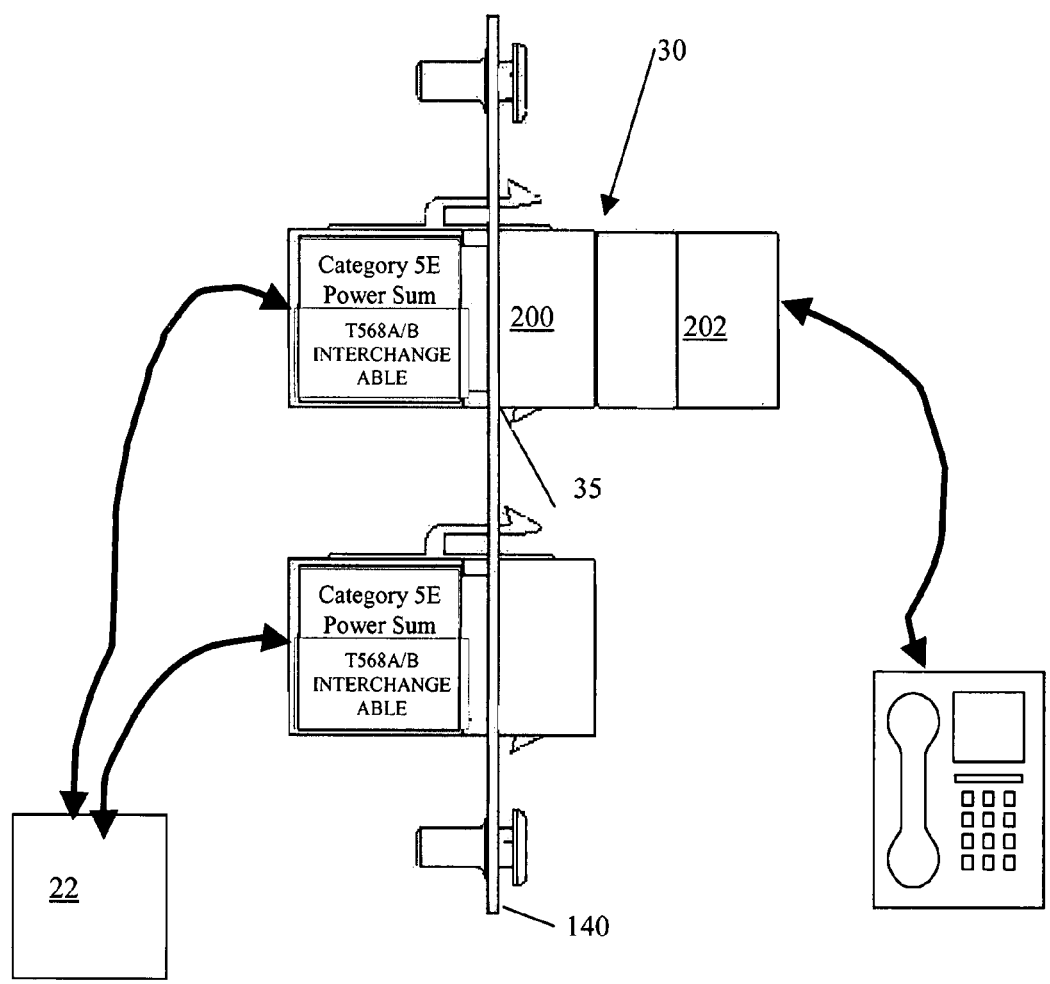
FIG. 5a shows an example implementation of the location device of FIG. 3.

Referring again to FIG. 3, the location device 30 also has the monitoring module 210 for continuously monitoring the operation of the ports 200,202. The monitoring module 210 detects when a new communications device 28 is connected to the location device 30 (e.g. a user plugs in their IP phone into the wall outlet of their office that is connected to the location device 30—see FIG. 5—assigned to that outlet/office) by detecting the signature (e.g. detecting of a predefined initialization packet or message—e.g. SIP or H323 call setup messages) of the respective initialization/start-up process for the newly connected (or reconnected) communications device 28.

One embodiment of the initialization process can include a series of power checks to determine whether the communications device 28 is configured to receive POE. The first check can include providing a small voltage level induced on the device port 202 until a valid end device (e.g. communications device 28) is detected. After a time controlled start-up, the port 202 begins supplying the maximum/configured power level (e.g. 48 VDC) to the device port 202 for consumption by the detected communications device 28 until the communications device 28 is physically or electrically disconnected (at which point the voltage/power is shut down). One embodiment of the power checks for powering up a POE link is as follows: stage 1—detection by measuring whether the connected communications device 28 has a correct signature resistance (e.g. 15-33 kL) using a test voltage (e.g. 1.8-10.0 volts); stage 2—classification by measuring which power level class the resistor indicates by using a classification voltage (e.g. 12.5-25.0 volts); and stage 3—normal operation by supplying power 25 according to the power requirements of the detected communications device 28 (e.g. supplying 25.0-60.0 volts) via the device port 202.

A second embodiment of the initialization process, detectable by the monitoring module 210, is registration (e.g. DHCP, BOOTP, etc.) of the communications device 28 attempted with the network administrator server 24 (see FIG. 1). The registration process assigns an IP address to the communications device 28 from a pool of addresses for certain durations of time. DHCP, short for Dynamic Host Configuration Protocol, is a protocol for assigning dynamic network 11 IP addresses to the communication devices 28. The dynamic addressing facilitates the communications device 28 to have a different/selected IP address every time the communication device connects to the network 11 via the location device 30. It is recognised that the communication device's 28 IP address can change while the communication device 28 remains connected to the network 11. DHCP lets network administrator server 24 centrally manage and automate network 11 connection requests and their subsequent assignment of Internet Protocol (IP) addresses to the communication devices 28 connected to an organization's network 11 (e.g. intranet). Using the Internet Protocol, each communication device 28 connects to the Internet using a unique IP address, which is assigned by the administration server 24 when the Internet connection is created for a specific communication device 28. DHCP automatically assigns a new IP address when the communication device 28 is plugged into an entry point (e.g. location device 30) of the network 11, using the concept of a "lease" or amount of time that the assigned IP address will be valid for a selected communication device 28. DHCP also supports static addresses for computers that need a permanent IP address, such as Web servers. Another network IP management protocol is the Bootstrap Protocol (BOOTP). A DHCP or BOOTP client can be a program that is located in (and perhaps downloaded to) each communications device 28 and stored in the memory 110 (see FIG. 2) so that the communications device 28 can be configured for network 11 communications. For example, many ISPs use dynamic IP addressing for dial-up users.

Another embodiment of the registration process is when the user logs on to the communications device 28 already connected to the network 11. In this case, the communications device 28 can then register (e.g. sends an SIP message (an invite) over the network 11 to an SIP register which is maintained by the user's VoIP service provider) with the SIP proxy server 23 to facilitate dialling calls by methods other than using IP address. The SIP proxy server 23 can also provide hold and transfer services. In this case, the administration server 24 points to a DNS server (e.g. SIP server 23) on the Internet 11 and the administration server 24 will use the SIP proxy server 23 to register the communications device 28 with the SIP register. Once registered (e.g. the communications device 28 receives an SIP acknowledgement), two-way communication is enabled between the proxy server 23 and the communications device 28. At this stage, the location device 30 can send out a SIP message with the location information 31 (e.g. including the description for the physical location) or can communicate the location ID of the location device in order to cause the update of the database 114 with location information 31, for example.

Device 30 Examples

As described above, the location device 30 (e.g. an adapter) can operate in a fashion similar to a hub in that it normally forwards all packets (i.e. data 26) in both directions between the network 11 (e.g. via the network server 22) and the communications device 28. In one embodiment, referring to FIG. 5a, the location device 30 is mounted on the front of a faceplate 140 that is in turn connected to the intranet 11 connected to the network server 22. The mounting can take the form of tamper resistant locking devices 35, such as but not limited to locks, clips, pins, screws, levers, and/or other mechanical fasteners as is known in the art. It is recognised that the locking devices 35 could also permanently attach the location device to the faceplate, such as but not limited to an adhesive. Accordingly, the location device 30 can be (fixed) anchored to a location by mounting it on the faceplate 140. The tamper-resistant locking device 35 prevents accidental/unauthorized removal from the faceplate 140, thereby locking the locking device 35 into a fixed known location.

Figure 5B:
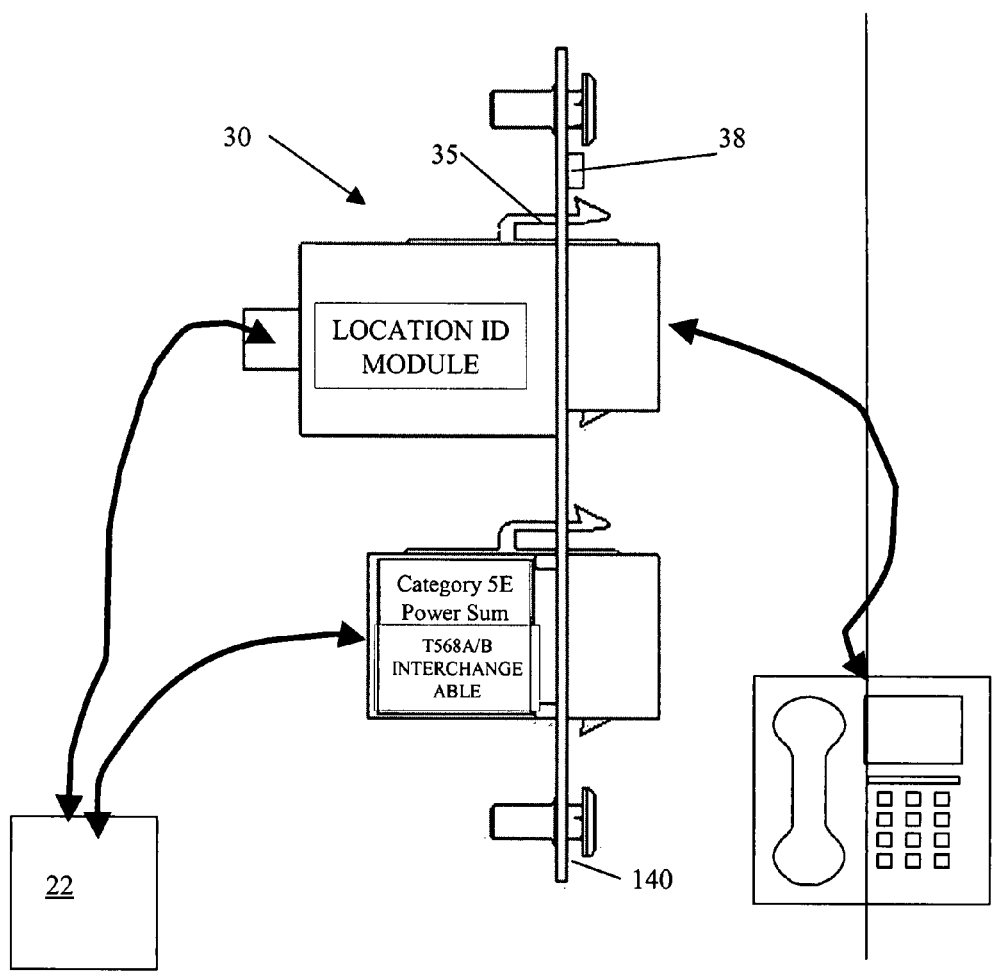
FIG. 5b shows a further example implementation of the location device of FIG. 3.

In a second embodiment, referring to FIG. 5b, the location device 30 is mounted on the rear of the faceplate 140. In both embodiments, the attachment configuration of the location device 30 to the faceplate 140 is fixed to the faceplate 140 physical location, such that removal of the location device 30 from the faceplate 140 would require reconfiguration of the location information 31 (see FIG. 1a) associated with the respective location device 30. It is recognised that the location information 31 can be associated with the location device 30 in a number of ways, such as but not limited to: a unique ID that is embedded in the memory 210 of the location device 30, such that at the time of installation location device 30 (i.e. onsite in the communications environment 20) this unique ID is mapped to the respective physical location and a description of this physical location is stored or otherwise made available to the emergency database 104; the location device 30 is programmable with the physical location (for example using a USB adapter via the interface 202—see FIG. 2—or over the network 11), such that any calls associated with this location device 30 include the programmed/stored physical location; or a combination thereof.

Another embodiment of the location device 30 is where the faceplate 140 has one or more jacks, such that at least one of the jacks incorporates/embeds the location device 30 as part of the faceplate 140, in order to replace any static/existing faceplate or furniture plate that does not contain any location devices 30. The faceplate 140 could also incorporate input means 38 such as a keypad, IR, Bluetooth, USB to enable programming of the embedded location device 30 that is part of the faceplate 140 itself. It is recognised that the circuitry of the input means 38 of the faceplate 140 could be used to program the embedded location device 30, as well as the functionality of other jacks located on the faceplate 140. It is recognized that the location device 30, in an alternative embodiment could also be fixed to the communications device 28, as desired.

Configuration Module 214

The location device 30 can also have a configuration module 214 that communicates with the user interface 102 (see FIG. 2) in order to receive modifications (e.g. configuration data) to the content of the location information 31 resident in the location device 30. For example, an installer of the location device 30 can program the content of the location information 31 contained in the memory 110 upon installation of the location device 30, including the network address of the emergency call distribution system 27. It is recognised that the device port 202 (or separate configuration port—not shown) can be used to receive the modifications to the content of the location information 31. The configuration module 214 can also communicate with the input means 38 to receive any configuration data.

It is also recognised that the location device 30 can be provided with one or more inputs (e.g. including sensors) to receive information from its immediate vicinity to provide up-to-date information that could facilitate emergency personnel to direct calls to specific agencies as well as provide current status of the user of the communications device 28 to medical and law personnel. For example, the configuration module 214 could be coupled to the network 11 and/or input means 38, so as to receive the up-to-date (e.g. dynamic updates) to the location information 31 stored in the memory 110 of the location device 30. These inputs can include data such as but not limited to: status information of the building elevators or other mechanical systems of the building; condition of the immediate geographical vicinity of the building (e.g. road closures, traffic reports, etc.); input from building security. Accordingly, the dynamic updates available in the memory 110 can be included with the location information 31 in the update message 37 sent to the emergency system 27.

Further, interactive queries can be activated with respect to the location device 30 and the user of the coupled communications device 28 at time of placing the emergency call (and/or at the time for device 28 initialization for example), wherein the queries ask for and accept input from the user of the communications device 28. These queries can include user status such as mobility, medical condition of the caller, or other user specific information that is to be included with the location information 31, etc. This user information is then forwarded to the 911 operators. In the case of user specific information, this information can be stored in the memory 110 for only the user session that the current communications device 28 is coupled to the location device 30. Once the communications device 28 is disconnected (or after a certain period of time after disconnection or before connection of a new location device 28) from the location device 30, the user specific information would be deleted from the memory 110.

Further, it is recognised that the installer or administrator of the location device 30 can pre-program location specific queries into the location device 30 that is activated during the emergency call and/or communications device 28 initialization process.

It is recognised in the above-described operation of the configuration module 214 that the location device 30 is capable of monitoring SIP/H.323 packets (e.g. data 26) and generating and transmitting packets (e.g. messages 37) to the emergency system 27 (e.g. 911 operator).

Location Registration Module 212

The location device 30 also has a location registration module 212 for associating the location of the location device 30 with the device identifier 29 of the connected communications device 28.

One example of this association is where the location device 30 can be used for ID (MAC or IP address) spoofing, where the ID of the communication device 28 is replaced by the ID of the location device 30, whose location information is already programmed in the database 114 (see FIG. 1b). This ID spoofing process applied to location devices 30 can be similar to other spoofing processes such as Network Address Translation (NAT, also known as Network Masquerading, Native Address Translation or IP Masquerading)). This application of the spoofing process to the location device 30, in order to associated the location information 31 with the communications device 28, can be particularly useful with IP address spoofing when one or more static IP addresses are assigned to the location device 30 with corresponding entry in the database 114 and is used for all communication with communication device(s) 28 attached to the location device 30.

The act of associating the device identifier 29 of the communications device 28 with the location information 31 of the location device can be done in a number of different ways, such as but not limited to the following example processes.

Registration Process I

The location device 30 has a unique ID (e.g. location information 31) that is embedded in it (e.g. stored in the memory 110—see FIG. 2). At the time of installation of the location device 30 in the communications environment 20 (see FIG. 1a), this unique location ID is mapped to a physical location and this physical location information 31 is stored in the emergency database 114 (see FIG. 1b). When a user plugs in the communications device 28 into the location device 30, the module 112 uses a mechanism to identify that the communications device 28 is attempting registration (Example: recognising DHCP, BOOTP, power-up—see initialization examples described with respect to the monitoring module 210). For example, the module 112 identifies the MAC address of the communications device 28 during device 28 initialization and uses that information along with the its own unique ID (e.g. location information 31) to communicate a location update message 37 (e.g. containing the device identifier 29 linked to the location identifier 31) the emergency database 114. As mentioned above, the unique ID and corresponding physical location information of the location device 30 (e.g. information 31) can already be stored in the database 114, thus facilitating linking of the communications device 28 with the physical location of the location device 30. The result of the sending of the location update message 37 to the emergency database 114, during the initialization process of the communications device 28, is that the MAC address of the device 30 is tied to the physical location through the unique ID of the location device 30. Accordingly, any calls originating from this communications device 28 will now be identifiable by the PSAP to the physical location associated with it via the respective location device 30.

Registration Process II

The location device 30 is programmable with the location information 31, for example using a USB adapter or over the network 11, during installation of the location device 30 in the communications environment 20. When the communications device 28 is subsequently plugged in to the location device 30, the communications device 28 tries to initialize itself (Example: recognising DHCP, BOOTP, power-up—see initialization examples described with respect to the monitoring module 210) for subsequent voice communication over the IP network 11. During the initialization process, for example, the module 212 (for example with the help of the monitoring module 210) identifies the MAC address of the device 28 and then communicates the location update message 37 (e.g. containing the device identifier 29 linked to the location identifier 31) the emergency database 114, thus updating the current location information 31 for the device 28 in the database 114. Any calls originating from this device 28 will now have an up to date physical location. It is recognised that for the registration processes I and II, the location device 30 can be active only during the device 28 initialization process, after which the location device 30 goes into a sleep mode. For example, the registration I or II activity can be triggered by POE start-up process (e.g. as defined in IEEE 802.3af).

It is noted in view of the above described registration processes I/II that the location device 30 is monitoring data 26 activities on a continuous basis, for example, or can be configured so as to only trigger during the communication device startup or registration process (as identifies as the initialization process by the monitoring module 210) and then go into sleep mode. When the location device 30 notices a predefined data 26 packet or a message, for example SIP or H323 call setup messages, the location device 30 updates the location information database 114 with the location information via message 37 for the device 28 that is doing the call setup, as discussed above. To do so, the location device 30 can use the device identifier 29 (e.g. the MAC address of the user device).

Registration Process III

It is also recognised that the timing for communication of the update message 37 by the location device 30 can also be done at the time of making the emergency call by the communications device 28. For example, the monitoring module 210 is able to recognise emergency calls (e.g. 911 calls) of specific SIP messages that are directed to the emergency system 27. For example, the monitoring module 210 could identify specific portions of the headers (e.g. network address or identification number of the emergency system 27) of the call data 26 that indicate the call data 26 should be considered as an emergency call. In this case, the location device could embed/include the location information 31 available from the storage 110 in the call data 26, could send the update message 37 containing the device ID 29 and the location information 31 to the emergency system 27 at the same time as the call data 26 is being communicated thereto, or a combination thereof.

In view of the above, it is recognised that the location device 30 can be hardware, software, or a combination thereof. In particular, the ports 200,202 and modules 206, 210,212, 214 can also be embodied as hardware and/or programmed instructions (e.g. software), as desired.

Operation of the Location Device 30

Figure 6:
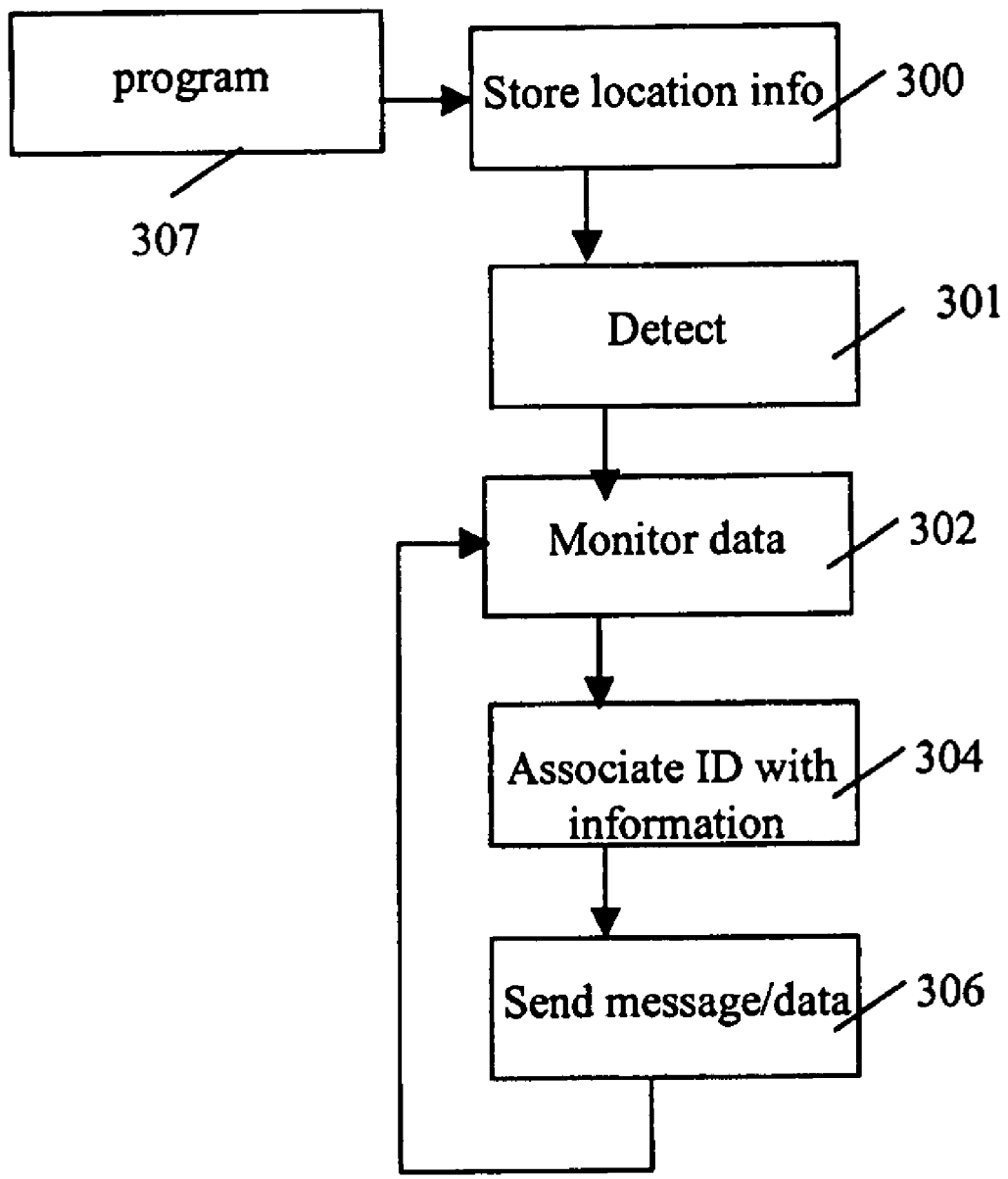
FIG. 6 shows an example operation of the location device of FIG. 1.

Referring to FIG. 6, at step 300 the location device 30 stores the location information 31 related to the physical location of the device 30 itself. At step 301, the location device 30 detects the initialization of the communication device 28 with identification of the device ID 29. Step 301 can be an optional step if the association of the location information 31 with the device ID only occurs at the time of the emergency call. At step 302, the monitoring module 210 monitors operation of the network port 200 coupled to the communications network 11 and/or the device port 202 coupled to the communications device 28 to detect an initialization process of the communications device 28 and to identify the assigned device identification 29 (if not already done at step 301), such that the ports 200,202 are configured for communicating the call data 26 between the ports 200,202. At step 304 the registration module 212 prepares the update message 37 and/or amends the call data 26 (e.g. retrieves from memory 110 or otherwise identifies the device ID and associates that ID 29 with the location information 31) and then forwards at step 306 the message 37 and/or data 26 over the communications network 11 via the network port 200 in response to the detected initialization process. The location update message 37 includes the location information 3 and the identified device identification 29. At step 307, the location information 31 of the device 30 can be updated or otherwise modified as described above by example.

Accordingly, a system and method is described above for associating a physical location with the communications device 28, such that the communications device 28 is configured for having an assigned device identification 29 and configured for using an assigned network address for use in routing call data 26 over the communications network 11.

I claim:

1. A location device for associating a physical location with a communications device, the communications device configured for having an assigned device identification and configured for using an assigned network address for use in routing call data over a communications network, the location device comprising:
   a memory for storing location information related to the physical location;
   a device port for coupling to the communications device and a network port for coupling to the communications network, the ports configured for communicating the call data between the ports;
   a monitoring module configured for monitoring operation of at least one of the ports for detecting an initialization process of the communications device and for identifying the assigned device identification; and
   a location registration module configured for communicating a location update message over the communications network via the network port in response to the detected initialization process, the location update message including the location information and the identified device identification.

2. The location device of claim 1, wherein the initialization process is selected from the group comprising: a power-up process for supplying the communications device with operating power; and an addressing process for assigning the network address to the communications device.

3. The location device of claim 2, wherein the power-up process is a multistage process.

4. The location device of claim 2, wherein location information is selected from the group comprising: location identification assigned to the location device for use in accessing a definition of the physical location; and a definition of the physical location.

5. The location device of claim 4, wherein the addressing process includes a request message for the network address, the addressing process selected from the group comprising: SIP; DHCP; and BOOTP.

6. The location device of claim 4 further comprising a connection for connecting to a power source for supplying operating power to the location device.

7. The location device of claim 6, wherein the power source is selected from the group comprising: inline power; and an independent power supply.

8. The location device of claim 7 further comprising the connection as part of the network port and further coupled to the device port for providing inline power to the communications device.

9. The location device of claim 8, wherein the device identification is a MAC address.

10. The location device of claim 9, wherein the physical address is that of the location device.

11. The location device of claim 8, wherein the definition of the physical location includes information selected from the group comprising: a street address; a mailing address; a geographical coordinate; and a description of a location within the physical location.

12. The location device of claim 11, wherein the communications device is selected from the group comprising: an IP phone; a computer configured for IP telephony; and an analogue phone connected to an ATA.

13. The location device of claim 12 further comprising a configuration module for configuring the content of the location information.

14. A method for associating a physical location with a communications device, the communications device configured for having an assigned device identification and configured for using an assigned network address for use in routing call data over a communications network, the method comprising the acts of:
   storing location information related to the physical location;
   coupling to the communications device and a network port for coupling to the communications network;
   monitoring operation of at least one of a network port coupled to the communications network and a device port coupled to the communications device for detecting an initialization process of the communications device and for identifying the assigned device identification, the ports configured for communicating the call data between the ports; and communicating a location update message over the communications network via the network port in response to the detected initialization process, the location update message including the location information and the identified device identification.

15. The method of claim 14, wherein the initialization process is selected from the group comprising: a power-up process for supplying the communications device with operating power; and an addressing process for assigning the network address to the communications device.

16. The method of claim 15, wherein location information is selected from the group comprising: location identification assigned to a location device having the ports for use in accessing a definition of the physical location; and a definition of the physical location.

17. The method of claim 16 further comprising the act of supplying operating power of a power source from the device port to the communications device.

18. The method of claim 17, wherein the power source is selected from the group comprising: inline power; and an independent power supply.

19. The method of claim 18, wherein the operating power is communicated from the network port to the device port as inline power to the communications device.

20. The method of claim 17 further comprising the act configuring the content of the location information.

21. The method of claim 17, wherein the location information is stored in a location device that is mounted in the physical location using a tamper-resistant device.

22. The method of claim 21, wherein the location device is connected to a network jack coupled to the communications network.

* * * * *